(12) United States Patent
Shinmo et al.

(10) Patent No.: US 6,361,718 B1
(45) Date of Patent: Mar. 26, 2002

(54) ARTICLE HAVING UNEVEN SURFACE, PRODUCTION PROCESS FOR THE ARTICLE, AND COMPOSITION FOR THE PROCESS

(75) Inventors: Katsuhide Shinmo; Kenichi Nakama, both of Osaka (JP)

(73) Assignee: Nippon Sheet Glass Co., Ltd., Osaka (JP)

(*) Notice: Subject to any disclaimer, the term of this patent is extended or adjusted under 35 U.S.C. 154(b) by 0 days.

(21) Appl. No.: 09/411,224

(22) Filed: Oct. 4, 1999

Related U.S. Application Data

(63) Continuation of application No. PCT/JP99/00460, filed on Feb. 3, 1999.

(30) Foreign Application Priority Data

Feb. 5, 1998 (JP) .............................. 10-024526

(51) Int. Cl.$^7$ ................................ B29D 11/00
(52) U.S. Cl. ................. 264/1.21; 65/17.2; 65/17.3; 264/1.33; 264/1.7
(58) Field of Search ................ 264/1.1, 1.21, 264/2.7, 259, 1.33, 1.7; 65/17.1, 17.2, 17.3

(56) References Cited

U.S. PATENT DOCUMENTS

| | | |
|---|---|---|
| 4,026,720 A | 5/1977 | Ikeda |
| 4,439,239 A | 3/1984 | Greigger et al. |
| 5,869,152 A * | 2/1999 | Colon |

FOREIGN PATENT DOCUMENTS

| | | |
|---|---|---|
| JP | 62-102445 | 5/1987 |
| JP | 63-49702 | 3/1988 |
| JP | 2-36282 | 2/1991 |
| JP | 3-221577 | 9/1991 |
| JP | 6-242303 | 9/1994 |

OTHER PUBLICATIONS

Patent Abstracts of Japan, 018(No. 627)(P–1834) Nov. 29, 1994, Abstract of JP 06–242203.
DATABASE WPI, Section Ch, Week 199221, Derwent Publications Ltd., London, GB; Class A26, AN 1992–171930 XP002151997.

\* cited by examiner

*Primary Examiner*—Mathieu D. Vargot
(74) *Attorney, Agent, or Firm*—Wenderoth, Lind & Ponack, L.L.P.

(57) ABSTRACT

A process for producing an article having a finely uneven surface coated with a film, which has high heat resistance and which neither cracks nor peels off from a substrate, by forming a film of a sol material between a substrate and a mold in such a manner that the film is in close contact with them and applying heat to form a gelled film, which has a surface configuration that is the inversion of the surface configuration of the mold, on the surface of the substrate, wherein the sol material contains (A) $R_2SiX_2$ (R is an alkyl group and X is an alkoxyl group or halogen atom) and (B) $R'SiX'_3$ (R' is an aryl group or substituted aryl group and X' is an alkoxyl group or halogen atom).

9 Claims, 2 Drawing Sheets

ARTICLE HAVING UNEVEN SURFACE, PRODUCTION PROCESS FOR THE ARTICLE, AND COMPOSITION FOR THE PROCESS

This is a continuation of PCT/JP99/00460, filed Feb. 3, 1999.

TECHNICAL FIELD

The present invention relates to articles having a finely uneven surface (small dents and small projections) and, particularly, to micro optical elements and information recording medium substrates as well as a production process and composition for the same.

BACKGROUND ART

Optical parts such as CD-ROMS, other information recording media, plate microlenses (an array of a large number of microlenses arranged in parallel on a plate), Fresnel lenses and diffraction grating elements must have fine irregularities (small dents and small projections) on the surface. The fine irregularities on the surface function as a pit or tracking guide in an information recording medium or as a microlens or diffraction grating to focus or diffuse light in an optical part.

To form irregularities on the surface, there is known a process which comprises spreading an ultraviolet curable resin over a substrate uniformly and exposing the resin to ultraviolet radiation with the resin pressed with a mold having irregularities (JP-A 63-49702).

JP-A 62-102445 discloses a process for producing an article having irregularities on the surface by means of a so-called "sol-gel process" which comprises coating a solution containing silicon alkoxide on a glass substrate and heating the substrate with the substrate pressed with a mold having irregularities to form irregularities. JP-A 6-242303 discloses a process for forming a plurality of layers on a substrate when a film having a thickness of several micrometers or more is formed by means of the sol-gel process. In this case, a solution or sol containing the constituents of each layer is poured over a completely solidified layer, which is formed by coating the solution or sol on the existing layer and heating the layer with the layer pressed with a mold, to form an upper layer.

However, the above prior art technologies have the following problems. Firstly, the ultraviolet curable resin has such low heat resistance that it decomposes or yellows at temperatures of 250° C. or above. Therefore, a substrate having irregularities which is made of an ultraviolet curable resin cannot be subjected to a heat treatment such as soldering and is difficult to be mounted on a device.

In contrast to this, irregularities made of silicon alkoxide by the sol-gel process has high heat resistance and can be soldered. However, the sol-gel process has such a problem that a thick film cannot be formed. In fact, when a silicon alkoxide layer of several tens of micrometers is formed by the sol-gel process, fine cracks emerge on the surface of the layer. This is because large stress is produced on the surface due to a difference in the progress of a polycondensation reaction between the surface and the interior of this layer when a silicon alkoxide solution is gelled and solidified. Further, this stress sometimes causes the layer to peel off from the substrate.

An organopolysiloxane layer having irregularities and a thickness of several tens of micrometers can be formed by molding a plurality of organopolysiloxane layers sequentially. However, the production process is long, thereby boosting costs. In addition, since a solution for the next layer is poured after an under layer is completely cured, undesirable air easily enters in a space between the mold and the solution or sol, thereby reducing the dimensional accuracy of the irregularities.

DISCLOSURE OF THE INVENTION

The present invention has been made in view of the above problems of the prior art. It is an object of the present invention to provide a process for producing an article which has a finely uneven surface and high dimensional accuracy and whose surface film has high heat resistance, does not crack even if it is a single-layer film having a thickness of several tens to several thousands of micrometers and does not peel off from a substrate.

It is another object of the present invention to provide a composition for forming the above film.

It is still another object of the present invention to provide an article having an uneven surface which is produced by the process of the present invention.

Other objects and advantages of the present invention will become apparent from the following description.

According to the present invention, firstly, the above objects and advantages of the present invention are attained by a process for producing an article having an uneven surface, comprising forming a film of a sol material between the substrate of the article and a mold in such a manner that the film is in close contact with these and heating the film to form a gelled film, which has a surface configuration that is the inversion of the surface configuration of the mold, on the surface of the substrate of the article, wherein the sol material contains (A) a silane compound represented by the following formula (1):

$$R_2SiX_2 \qquad (1)$$

wherein R is an alkyl group and X is an alkoxyl group or a halogen atom, and (B) a silane compound represented by the following formula (2):

$$R'SiX'_3 \qquad (2)$$

wherein R' is a substituted or unsubstituted aryl group and X' is an alkoxyl group or a halogen atom.

According to the present invention, secondly, the above objects and advantages of the present invention are attained by an article having an uneven surface which is produced by the process of the present invention, wherein an organopolysiloxane film having irregularities is formed to a thickness of 1 μm to 1 mm on the surface of the substrate of the article and contains 5 to 25 wt % of an alkyl group and 5 to 40 wt % of an aryl group.

According to the present invention, finally, the above objects and advantages of the present invention are attained by a composition for forming a film for producing an article having an uneven surface, which contains:

(A) a dialkyldialkoxysilane in an amount of 1 mol, (B) a trialkoxysilane having an aryl group or substituted aryl group in an amount of 0.2 to 4 mol, (C) an alcohol in an amount 0.3 to 3 times the total number of moles of the components (A) and (B), (D) an acid catalyst in an amount 3 to 20 times the total number of moles of the components (A) and (B), and (E) water in an amount 2 to 20 times the total number of moles of the components (A) and (B).

DETAILED DESCRIPTION OF THE PREFERRED EMBODIMENTS

Figure 1:
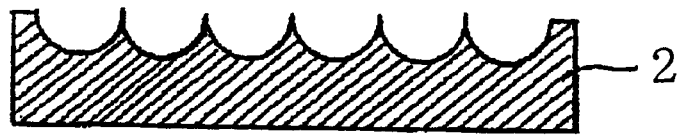
FIG. 1 is a sectional view of a mold according to one embodiment of the present invention.

In the present invention, a sol material contains both a silane compound represented by the above formula (1) and a silane compound represented by the above formula (2).

In the above formula (1), R is an alkyl group and X is an alkoxyl group or halogen atom.

The alkyl group represented by R may be either straight-chain or branched-chain and is preferably an alkyl group having 1 to 3 carbon atoms.

The alkoxyl group represented by X may be either straight-chain or branched-chain and is preferably an alkoxyl group having 1 to 4 carbon atoms. The halogen atom represented by X is, for example, fluorine, chlorine or bromine.

Preferred examples of the silane compound represented by the formula (1) include dialkyldialkoxysilanes such as dimethyldiethoxysilane, dimethyldimethoxysilane, diethyldiethoxysilane and diethyldimethoxysilane; and dialkyldichlorosilanes such as dimethyldichlorosilane and diethyldichlorosilane.

In the above formula (2), R' is a substituted or unsubstituted aryl group and X' is an alkoxyl group or halogen atom. The unsubstituted aryl group is preferably an aryl group having 6 to 13 carbon atoms such as phenyl, biphenyl or naphthyl. The substituent of the aryl group is preferably an alkyl group having 1 to 3 carbon atoms or halogen atom. The aryl group substituted by the above substituent is preferably a tolyl group, xylyl group, chlorophenyl group or the like.

Illustrative examples of the alkoxyl group and the halogen atom represented by X' are the same as those listed for X in the formula (1).

Illustrative examples of the compound represented by the above formula (2) include trialkoxysilanes having a phenyl group or substituted phenyl group such as phenyltriethoxysilane, phenyltrimethoxysilane, triethoxysilane having a substituted phenyl group obtained by substituting part of the hydrogens of a phenyl group by a halogen atom such as a chlorine atom, and trimethoxysilane having the same substituted phenyl group as described above; phenyltrichlorosilane, and trichlorosilane having a substituted phenyl group obtained by substituting part of the hydrogens of a phenyl group by a halogen atom such as a chlorine atom; tolyltrimethoxysilane and tolyltriethoxysilane; tolyltrichlorosilane; xylyltrimethoxysilane and xylyltriethoxysilane; xylyltrichlorosialane; biphenyltrimethoxysilane and biphenyltriethoxysilane; biphenyltrichlorosilane; and the like.

An alkoxysilane such as methoxysilane or ethoxysilane is preferably used as the component (A) represented by the above formula (1) and the component (B) represented by the above formula (2) because an alcohol generated by a hydrolytic reaction easily volatilizes. A preferred combination of the component (A) and the component (B) as the raw materials of the sol material is dimethyldialkoxysilane and phenyltrialkoxysilane.

In the present invention, the components (A) and (B) are used as the raw materials of the sol material. The alkyl group and the aryl group remain in large quantities in the film that is eventually obtained by coating the sol material on the substrate of the article. The alkyl group and the aryl group serve to reduce the fragility of the film and to provide elasticity to the film, thereby making it possible to suppress thermal stress generated in the interior of the film and to prevent the film from cracking and peeling off from the substrate of the article.

A case where a dialkyldialkoxysilane is used as the component (A) and a trialkoxysilane having an aryl group or substituted aryl group is used as the component (B) will be described hereunder.

As for the film structure of the present invention, the terminal of the straight-chain dialkoxysilane extending like a fiber is retained by the trialkoxysilane three-dimensionally through the mixing of the dialkoxysilane and the trialkoxysilane, whereby allowance is generated in the three-dimensional skeleton, which provides elasticity to the film and reduces the fragility of the film, thereby making it possible to form a thick film.

The significance of the aryl group or substituted aryl group contained in the film of the present invention containing is that these groups are bulky enough to provide elasticity to the skeleton structure of an oxide contained in the film while suppressing the fragility of the film and that they have stability at high temperatures because of their conjugated system, as compared with other organic groups. For example, a film containing cyclohexyltrialkoxysilane, which is obtained by substituting an aryl group or substituted aryl group by a cyclohexyl group having no conjugated system, and dialkyldialkoxysilane discolors at 200 to 300° C. and cracks.

It is preferable that the sol material contain the component (A) and the component (B) in a molar ratio of 1:0.2 to 1:4 as raw materials. When the amount of the component (B) is smaller than 0.2 mol, the film is hardly cured, most of the components volatilize during final heating, and the film is hardly formed in the end. When the amount of the component (B) is larger than 4 mol, the flexibility of a film is impaired, and a film of 20 μm or more in thickness readily cracks during final heating or cooling after the final heating. It is more preferable that the film contain the component (A) and the component (B) in a molar ratio of 1:0.4 to 1:1.

When alkoxysilanes having an organic group other than the above, for example, a mixture of dimethyldimethoxysilane and vinyltriethoxysilane is used as the raw materials of the sol material, the obtained film has such low heat resistance that it thermally decomposes at 300° C. or less. When only tetraalkoxysilanes are used as the raw materials, when only alkyltrialkoxysilanes are used as the raw materials and when a mixture of a dialkyldialkoxysilane and an alkyltrialkoxysilane is used as the raw materials, film stress increases after final heating and a film of 20 μm or more in thickness cracks.

As another raw material of the sol material in the present invention, an alcohol solvent is added to a mixture solution of the component (A) and the component (B). The alcohol to be added is preferably a lower alcohol having 1 to 4 carbon atoms, particularly preferably methanol or ethanol having a low boiling point. The reason for this is that the alcohol can be removed from the solution swiftly by a heat treatment at a relatively low temperature after hydrolysis. The amount of the alcohol is preferably 0.3 to 3 times, more preferably 0.5 to 1.5 times the total number of moles of the components (A) and (B).

A catalyst for hydrolyzing alkoxysilanes is added to this solution. The catalyst is preferably an acid catalyst. An aqueous solution of at least one acid catalyst selected from formic acid, hydrochloric acid, nitric acid and sulfuric acid is preferably used as the acid catalyst. The amount of the acid catalyst is preferably 3 to 20 times, more preferably 5 to 15 times the total number of moles of the components (A) and (B). Water is preferably added in an amount larger than the stoichiometric amount required for hydrolysis. When the amount of water is smaller than the stoichiometric amount, unreacted alkoxysilanes are liable to volatilize during a heat treatment for gelation. The amount of water including the water of the aqueous catalyst solution is generally 1.1 to 3 times the required stoichiometric amount, or preferably 2 to 20 times, more preferably 4 to 10 times the total number of moles of the components (A) and (B).

In the present invention, the sol material is prepared by hydrolyzing both alkoxysilanes while a solution consisting of the component (A), the component (B), the alcohol solvent, water and the catalyst is stirred at room temperature for 90 to 120 minutes and is maintained.

Thereafter, it is preferred to proceed with a dehydration/polycondensation reaction by maintaining the resulting solution at room temperature to 140° C., preferably 70 to 100° C., for 6 to 30 hours and to vaporize or dissipate the solvent and water contained in the solution and an alcohol, which is the dehydration/polycondensation reaction product.

As a result, the mass and volume of the solution are reduced to 25 to 35% by weight and volume of the original mass and volume of the solution at the time of preparation. Thus, the cracking of the formed film is prevented by suppressing the shrinkage of the film as much as possible, and a cured film can be formed without forming air bubbles in the film during final heating. When this dehydration/polycondensation reaction proceeds too far, the viscosity of the solution becomes too high, thereby making it difficult to coat the solution on the mold or on the surface of the substrate. On the contrary, when the dehydration/polycondensation reaction proceeds insufficiently, it is impossible to prevent the formation of air bubbles in the film during final heating. It is preferred to control the progress of the dehydration/polycondensation reaction by selecting the temperature and the retention time to ensure that the viscosity of the solution becomes about $10^3$ poise or less.

In the present invention, a tetraalkoxysilane, an alkyltrialkoxysilane, an alkyl hydrogen dialkoxysilane, a silane halide obtained by substituting part or all of the alkoxyl groups of a tetraalkoxysilane by a halogen such as chlorine, a silane halide obtained by substituting part or all of the alkoxyl groups of the alkyltrialkoxysilane by a halogen such as chlorine, or a silane halide obtained by substituting part or all of the alkoxyl groups of the alkyl hydrogen dialkoxysilane by a halogen such as chlorine is newly added to the solution which has undergone the above dehydration/polycondensation reaction in an amount of 10% or less, preferably 0.001 to 10%, more preferably 0.001 to 0.1%, based on the total number of moles of the components (A) and (B). The resulting mixture is maintained at room temperature to 140° C., preferably 70 to 100° C., for 6 to 30 hours. Since the terminal of an oligomer having elasticity can be activated by the addition of the above component and the above solution becomes a solution which is readily gelled, the heating temperature for curing a film having an uneven surface molded by a mold can be reduced. As a result, the heating temperature for curing the film having an uneven surface molded by a mold can be reduced and the heating time can be shortened, so that work efficiency can be improved, the life of the mold can be extended, and dimensional differences in the plane direction of the substrate between the uneven surface of the mold and the uneven surface of the final film formed on the substrate become extremely small. When the addition amount of the above alkoxysilane or the like is larger than 10%, the obtained film easily cracks.

The alkyl hydrogen dialkoxysilane is preferably a compound represented by the following formula:

wherein $R^1$ is an alkyl group, preferably a methyl group or ethyl group and $R^2$ is an alkyl group, preferably an alkyl group having 1 to 4 carbon atoms.

Before the solution in which both alkoxysilanes have been hydrolyzed under agitation is subjected to the above dehydration/polycondensation reaction, the above tetraalkoxysilane, alkyltrialkoxysilane, alkylhydrogen dialkoxysilane or the like is preferably added likewise in an amount of 10% or less, preferably 0.001 to 10% based on the total number of moles of the components (A) and (B). Thereby, molding becomes easy and dimensional differences in the plane direction of the substrate between the uneven surface of the mold and the uneven surface of the film formed on the substrate become extremely small. When the hydrolysis and the dehydration/polycondensation reaction are carried out in succession at room temperature, the alkoxysilane may be added at any time after the agitation of hydrolysis ends and the polymerization proceeds to some extent and before an oligomer is formed.

Formamide can be added as a polymerization catalyst to the solution which has undergone the above dehydration/polycondensation reaction. Since formamide has a high boiling point of 210° C., it works effectively without being vaporized when heated at high temperatures to cure a film. Further, since it also serves as a dehydration catalyst, it can improve reactivity when the solution is cured, work effectively at the time of final heating and make it possible to form a film devoid of air bubbles by suppressing the formation of air bubbles caused by dehydration. The amount of formamide is preferably 1 to 10% based on the total number of moles of the components (A) and (B).

An article having an uneven surface is produced by forming a film of the sol material obtained as described above between the substrate of the article and the mold in such a manner that the film is in close contact with them, heating the film and forming a gelled film, which has a surface configuration that is the inversion of the surface configuration of the mold, on the surface of the substrate of the article. There are two typical processes for molding the film having a finely uneven surface.

The first process (to be referred to as "mold pouring process" hereinafter) comprises pouring the solution of the sol material over the mold, applying heat, bringing the substrate of the article into contact with the molded film, further applying heat to bond the molded film to the substrate of the article, releasing the bonded product from the mold and final-heating the product. That is, a mold having a finely uneven surface is held horizontally, and the liquid sol material having a viscosity of $10^3$ poise or less is poured over the mold so that every recess of the mold is filled with the sol material. Alternatively, the mold may be immersed in a bath of the sol material or coated with the liquid sol material by a brush. In this state, the sol material on the mold is maintained at 140 to 180° C. for 20 to 120 minutes to proceed with a dehydration/polycondensation reaction until the viscosity thereof preferably becomes $10^4$ to $10^8$ poise. Thereafter, the substrate of the article is placed upon the mold in such a manner that it is in close contact with the mold, and the sol material is brought into contact with the surface of the substrate in such a manner that no space is formed therebetween, maintained at 140 to 180° C. for 10 to 120 minutes and gelled by nearly completing the dehydration/polycondensation reaction of the sol material. Thereafter, the mold is removed from the substrate to form a polysiloxane film, which is a soft gelled film having an uneven surface that is the inversion of the uneven surface of the mold, on the surface of the substrate in such a manner that the polysiloxane film is bonded to the substrate. When the mold is removed too early, the polysiloxane film is so soft that the uneven surface of the film is deformed by its own weight. Therefore, the above application of heat is carried out until this deformation does not occur. By final-heating the polysiloxane film at 180 to 350° C. for 10 to 150 minutes, the residual silanol group of the polysiloxane film is polycondensed and water generated by the polycondensation is vaporized, whereby a fine film whose volume is slightly reduced in a thickness direction is obtained. Thus, an article having an uneven surface is obtained that is coated with a film having a surface configuration which is the inversion of the surface configuration of the mold.

The second molding process (to be referred to as "substrate pouring process" hereinafter) comprises pouring the sol material solution over the surface of the substrate directly, applying heat, pressing the mold against the surface of the substrate of the article when the liquid film acquires plasticity (or when the viscosity of the solution becomes about $10^4$ to $10^8$ poise), heating the substrate in this state, removing the mold after transfer-molding and final-heating the substrate. That is, the surface to be coated of the substrate of the article is held horizontally, the liquid sol material having a viscosity of about $10^3$ poise or less is poured and spread over the substrate of the article in the form of a film having a predetermined thickness. In this state, the poured sol material is maintained, for example, at 140 to 180° C. for 20 to 120 minutes to proceed with a dehydration/polycondensation reaction until the viscosity of the sol material becomes $10^4$ to $10^8$ poise. Then, the mold having a finely uneven surface is pressed against the film of the sol material and maintained, for example, at a pressure of 0.5 to 120 kg/cm$^2$ and a temperature of 160 to 350° C. for 60 seconds to 60 minutes to nearly complete the dehydration/polycondensation reaction to gel the sol material By removing the mold, a polysiloxane film, which is a gelled film having an uneven surface that is the inversion of the uneven surface of the mold, is formed on the surface of the substrate in such a manner that it is bonded to the substrate. Then, this polysiloxane film is final-heated at 180 to 350° C. for 10 to 150 minutes not only to polycondense the residual silanol group of the polysiloxane film but also to vaporize water generated by the polycondensation so as to obtain a fine film whose volume is reduced slightly in a thickness direction. Thus, an article having an uneven surface coated with a film having a surface configuration which is the inversion of the surface configuration of the mold is obtained.

As for the above mold, for example, a female mold having a target shape is formed by accurately etching the surface of a glass substrate having a flat surface. Using this mold as a master mold, a male metal matrix can be produced by an electroless and electrolytic plating method. A female metal matrix can be produced by the above plating method from a male metal master mold which is formed by the above plating method using the above female mold as a matrix. The male or female matrix can be used as a mold. A metal such as nickel or chromium is preferably used in the above plating method.

Using the master mold produced by the above method, a resin matrix is fabricated from an ultraviolet curable resin by a 2P molding method. This can be used as a mold.

The section of the polysiloxane film which is a gelled film in the present invention has such a shape as one or a plurality of circular arcs, oval arcs or mountains. By changing the shape of this projecting portion, various functions can be provided to the substrate. For example, the function of a plate microlens array, the function of a grating or the function of a prism array can be provided by changing the above shapes to a finely uneven shape.

The thickness of this polysiloxane film (after final heating) is preferably 1 $\mu$m to 1 mm in terms of average height between a projecting portion and a recessed portion of the film. When the film thickness is 20 $\mu$m or more, the ratio of the minimum value (height of the surface of the recessed portion of the film) to the maximum value (height of the surface of the projecting portion of the film) of the film thickness is desirably 0.25 or more, that is, minimum value/maximum value $\geq 0.25$, to prevent the film from peeling off from the substrate of the article and from cracking. When the ratio of the minimum value to the maximum value of film thickness (minimum value/maximum value) is smaller than 0.25, the film easily peels off from the substrate at a portion having the minimum thickness or easily cracks in a film molding step.

According to the present invention, a finely uneven single-layer film of organopolysiloxane having a high heat resistance of 350° C., a thickness of 1 $\mu$m to 1 mm and a refractive index of 1.50 to 1.54, which is close to that of ordinary glass, is formed on the substrate of the article. The organopolysiloxane forming the film preferably contains 5 to 25 wt %, more preferably 15 to 22 wt %, of an alkyl group such as a methyl group and also preferably contains 5 to 40 wt %, more preferably 26 to 37 wt %, of an aryl group such as a phenyl group. The film is very elastic (less fragile), has high strength and hardly cracks. Bubbles are not observed in the interior of the film at the time of molding, and excellent transferability can be achieved with the result of the extremely high dimensional accuracy of the fine unevenness of the film surface. Stated more specifically, when a large number of projecting portions having a height of 20 to 100 $\mu$m are formed, differences in the height of projecting portions on the surface of the film are 1 $\mu$m or less. A difference between the interval between projecting portions on the surface of the film and the interval between recessed portions of the mold is smaller than measurement accuracy (0.2 $\mu$m).

The substrate of the article used in the present invention may have any shape such as a plate-like, curved plate-like or rod-like shape. The surface of the substrate preferably has a warp (the length of thermal deformation in a direction perpendicular to the surface of the substrate per unit length in the surface direction of the substrate) at 200° C. and 20° C. of ±5 µm or less per cm. When the warp is beyond this range, the film may peel off from the substrate or crack at the interface in the film-molding step. It is preferable to select the material, size and shape of the substrate.

The substrate preferably has a linear expansion coefficient of $1.5\times10^{-5}$/° C. or less. When the linear expansion coefficient of the substrate is larger than $1.5\times10^{-5}$/° C., in the case of a plastic substrate having a high thermal expansion coefficient such as polypropylene (9 to $15\times10^{-5}$/° C.), the film peels off from the substrate or cracks at the interface in the step of molding an organopolysiloxane film. Ordinary inorganic glass has a linear expansion coefficient of $1.5\times10^{-5}$/° C. or less. At least the surface of the substrate is preferably made from an oxide. If the surface of the substrate which is in contact with the organopolysiloxane film is not made from an oxide, adhesion strength lowers in the film-molding step, and the film may peel off from the substrate at the interface as the case may be. Preferred examples of the material of the substrate include oxide glass such as silicate-based glass, boric acid-based glass, phosphoric acid-based glass, quartz, ceramics, metals, epoxy resins, glass fiber-reinforced polystyrene and the like. Although metals are not bonded to the organopolysiloxane film as they are, they can be advantageously used as a substrate if their surfaces are treated with an oxidant in advance.

When a transparent material, which transmits light having desired wavelength such as visible, ultraviolet or infrared light, is used as the substrate in the present invention, the article having an uneven surface of the present invention can serve as a transmission optical element such as a lens, diffraction grating or prism. When a transparent or opaque material is used as the substrate, a metal (such as aluminum or silver) or dielectric film (such as magnesium fluoride or titanium oxide) is formed on the organopolysiloxane film to be suitably used as a reflective diffraction grating, reflective optical element such as a Fresnel reflector or other information recording medium such as a CD-ROM.

EXAMPLES

An embodiment of the present invention will be described in detail hereunder.

Roughly speaking, the process for producing an article whose surface is finely uneven is carried out by the following steps.

(1) preparation of an organopolysiloxane solution, (2) coating of the solution on a mold or a substrate and heating of the coating film, (3) bonding, heat treatment and releasing, and (4) final heating.

[preparation of organopolysiloxane solutions (solutions A and B)]

There were charged 0.1 mol of phenyltriethoxysilane and 0.15 mol of dimethyldiethoxysilane into a beaker and stirred. Then, 0. 25mol of ethanol was added to this solution and stirred. Thereafter, an aqueous solution of 0.1 wt % of formic acid dissolved in 1.75 mol (31.5 g) of water was further added and stirred for 2 hours. At the beginning of agitation, the solution was separated into two layers but after 2 hours of agitation, a transparent homogeneous solution was obtained. When this solution was heated in an oven at 80° C. for 12 hours, ethanol, the aqueous solution of formic acid and the water produced by a polycondensation reaction volatilized. As a result, the weight and volume of the solution, whose weight and volume were initially about 91.2 g and about 100 cm$^3$, were reduced by about 30% to about 27 g and about 30 cm$^3$, respectively. The thus obtained solution is taken as solution A. The solution A barely contained ethanol and water, and about 50% of the ethoxy groups, which were initially contained in phenyltriethoxysilane and dimethyldiethoxysilane, remained as OH groups. Further, 0.001 mol of methyl hydrogen diethoxysilane was added to this solution A and stirred. The obtained solution is taken as solution B.

[coating of solution to mold or substrate and heat treatment of coating film]

Figure 2:
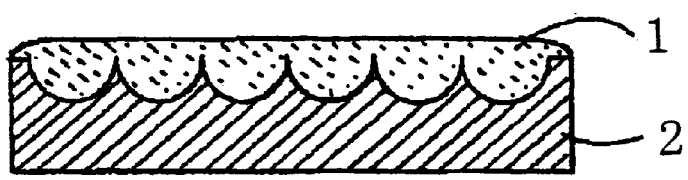
FIG. 2 is a sectional view showing that a sol material is coated on the mold of FIG. 1.
Figure 5:
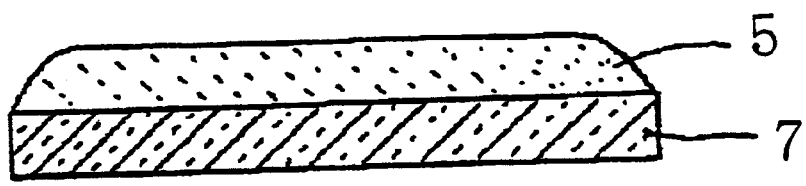
FIG. 5 is a sectional view showing that a sol material is coated on a substrate according to another embodiment of the present invention.

The above solution A or B was poured onto the surface of a mold 2 by the mold pouring process as typically shown in FIG. 1 and FIG. 2 and onto the surface of a substrate 7 by the substrate pouring process as typically shown in FIG. 5 to form a layer 1 (FIG. 1) and layer 5 (FIG. 5) having a thickness of 50 µm to 1 mm, and the layers were heated at a temperature of 140 to 180° C. for 20 to 120 minutes. The heat treatment temperature varied according to the type of the solution. The solution A was initially heated at 140 to 160° C., and the temperature was gradually raised to 180° C. over 20 minutes and maintained at that temperature for 40 minutes. The solution B was heated at 160° C. for 20 minutes. A gelled film (viscosity: $10^4$ to $10^8$ poise) which was plastically deformable could be formed on the mold 2 or the substrate 7 by these heat treatments.

[bonding, heat treatment and releasing]

Figure 3:
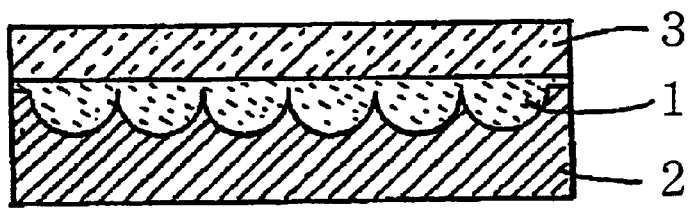
FIG. 3 is a sectional view showing that a substrate is brought into contact with the sol material of FIG. 2.
Figure 4:
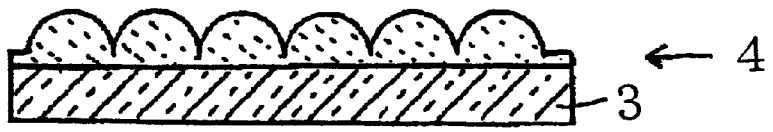
FIG. 4 is a sectional view of a substrate having fine irregularities after it is removed from the mold shown in FIG. 3.

In the case of the mold pouring process, the coated surface (gelled film) was brought into contact with the surface of the substrate 3 as shown in FIG. 3 and heated at 160 to 250° C. for 20 to 60 minutes in this state to be bonded to the substrate. After the coating film was completely gelled, the mold 2 was removed from the substrate 3. As a result, a finely uneven plate 4 having a film, which has the shape of the mold transferred as shown in FIG. 4, bonded thereto was obtained.

Figure 6:
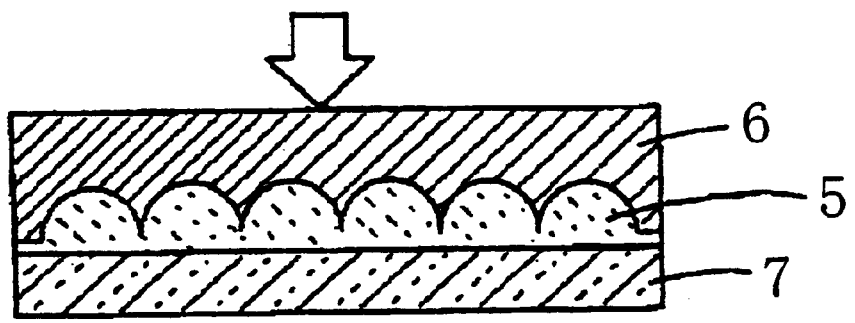
FIG. 6 is a sectional view showing that a mold is pressed against the sol material of FIG. 5.
Figure 7:
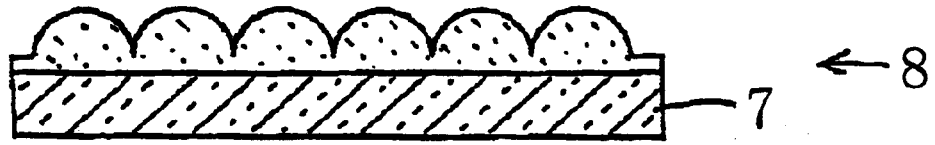
FIG. 7 is a sectional view showing a substrate having fine irregularities after it is removed from the mold shown in FIG. 6.

In the case of the substrate pouring process, the mold 6 was held against the gelled film 5 as shown in FIG. 6 and heated at 250° C. for 20 minutes while pressed with a pressure of 2 kg/cm$^2$. Thereafter, the film was removed from the mold. As a result, a finely uneven plate 8 having the shape of the mold transferred as shown in FIG. 7 was obtained.

[final heating]

The finely uneven plates 4 and 8 which had been released from the mold were heated at 350° C. for 15 minutes to obtain articles having an uneven surface.

The performance and characteristic properties of the obtained articles having an uneven surface were evaluated.

[measurement of differences in height of projecting portions]

The differences in the height of projecting portions of the outermost layer were measured by the measurement of height with a laser microscope.

[measurement of heat resistance and optical characteristics]

A heat resistance test was made on articles having an uneven surface produced in Examples and Comparative Examples as follows. In the test, the articles were maintained at 300° C. for 2 hours and returned to room temperature to observe the emergence of cracks for the purpose of evaluating heat resistance. A He—Ne laser was used to measure and evaluate the diffraction pattern of a diffraction grating, the converging performance of a microlens and the amount of reflection from the interior of a substrate at an incident angle on the surface of the substrate of about 60 before and after the heat resistance test. The d-ray refractive index of a film portion was measured using an Abbe refractometer.

Example 1

A 10-cm$^2$ soda lime glass substrate having a thickness of 1.1 mm (coefficient of linear expansion: $1.0 \times 10^{-5}/°$ C.) was prepared as a glass substrate. A nickel (Ni) mold having 80,000 straight V-shaped grooves (groove width: 1 µm, groove depth: 1 µm, groove section: regular triangle, groove length: 9 cm, interval between adjacent grooves (measured at the center of groove): about 2 µm) (to be referred to as "V-shaped groove Ni mold" hereinafter), which were parallel to one another, was prepared as a mold. A finely uneven plate, which was a diffraction grating, was formed in accordance with the substrate pouring process using the above substrate, mold and solution A so that the thickness of a flat area (devoid of linear projections) of the film became about 40 µm. The thickness of the coated solution was about 60 µm, and the heat treatment after coating was carried out by first heating at 160° C., raising the temperature gradually to 180° C. over 20 minutes and maintaining that temperature for 40 minutes. The pressure was 2 kg/cm$^2$, the heating conditions comprised a temperature of 250° C. and a time of 20 minutes, and the final heating conditions comprised a temperature of 350° C. and a time of 15 minutes.

The thus formed organopolysiloxane film was transparent and had a thickness in its flat portion of about 40 µm and a refractive index of 1.51. The film contained 18 wt % of a methyl group and 31 wt % of a phenyl group. When the heights of 100 points of 10 linear projecting portions selected at random from 80,000 projecting portions at intervals in a length wise direction of 9 mm were measured, the average height of linear projecting portions of this substrate was 1.0 µm and the standard deviation was 0.05 µm. When the heat resistance of the substrate was evaluated, the film did not crack, and the outer appearance, the height of each projecting portion of the film, its standard deviation and diffraction pattern were not changed from those before the heat resistance test.

Comparative Example 1

Methyltriethoxysilane, ethanol and water were mixed together in a molar ratio of 1:1:4, and 0.01 mol of hydrochloric acid was added as a catalyst to the resulting mixture and stirred at room temperature for about 30 minutes to prepare a sol solution.

A finely uneven substrate was formed using the same substrate and mold as used in Example 1 in the same manner as in Example 1 except that the above sol solution was used in place of the solution A of Example 1. However, the film cracked during cooling after the final heating conducted at 350° C., part of the film peeled off and the evaluation of size could not be carried out. When the evaluation of heat resistance was made on this substrate, a crack in the film enlarged, whereby the film further peeled off partly. Therefore, the height of each projecting portion of the film and its standard deviation after the heat resistance test could not be measured and there was a great change in diffraction pattern as compared with that before the heat resistance test.

Comparative Example 2

Phenyltriethoxysilane, ethanol and water were mixed together in a molar ratio of 1:1:4, and 0.01 mol of hydrochloric acid was added as a catalyst to the resulting mixture and stirred at room temperature for about 30 minutes to prepare a sol solution.

A finely uneven substrate was formed using the same substrate and mold as used in Example 1 in the same manner as in Example 1 except that the above sol solution was used in place of the solution A of Example 1. However, the film cracked during cooling after the final heating conducted at 350° C., and part of the film peeled off like methyltriethoxysilane of Comparative Example 1, so that the film could not be evaluated. There was a great change in the diffraction pattern of the substrate as compared with that before the heat resistance test.

Example 2

A finely uneven substrate was formed using the solution A and the same glass substrate as used in Example 1 in accordance with the mold pouring process. A Nickel (Ni) mold, which had about 22,500 substantially hemispherically concave portions with a curvature radius of 30 µm, which comprise about 150 of such contiguous portions in a longitudinal direction and about 150 of such contiguous portions in a transverse direction, was used as a mold. A finely uneven substrate, which was a microlens, was formed to ensure that the thickness of a flat area of the film after final heating was about 15 µm and the maximum thickness from the top of the hemisphere of the film was 40 µm. The thickness of the coating film of the solution on the Ni mold was about 60 µm. As for the heat treatment conditions after coating, the temperature was initially set to 160° C., raised to 180° C. over 20 minutes and maintained at that temperature for 40 minutes. The heating conditions after bonding the substrate comprised a temperature of 250° C. and a time of 20 minutes and the final heating conditions comprised a temperature of 350° C. and a time of 15 minutes.

The thus formed organopolysiloxane film was transparent and had a maximum thickness of about 40 µm and a refractive index of 1.51. This organopolysiloxane film was bonded to the surface of the glass substrate. The focusing distance of the fabricated micro lens was 95 to 98 µm. The film contained 18 wt % of a methyl group and 31 wt % of a phenyl group. As for the height of each projecting portion of the substrate (measured from the flat surface (surface opposite to the projecting portion) of the film), when 100 hemispherical projecting portions were randomly selected and measured, the average height of the projecting portions was 40.0 µm and the standard deviation was 0.12 µm. When the evaluation of heat resistance was made on this substrate, the film neither cracked or peeled off and the focusing distances of all the projecting portions were in the range of 95 to 98 µm and remained unchanged from values before the heat resistance test. When the diameter of a convergent spot obtained by inputting parallel rays perpendicularly from the opposite side of the film was measured, the diameters of the convergent spots of all the convex lenses were 3 µm or less and remained unchanged from values before the heat resistance test.

Example 3

A finely uneven substrate was formed using a quartz substrate as a glass substrate, a V-shaped Ni mold used in Example 1 and solution B in accordance with the substrate pouring process so that the thickness of a flat area of the film became about 100 µm. A heat treatment after the coating of the solution was carried out at 160° C. for 20 minutes. The pressure was 2 kg/cm$^2$, the heating conditions comprised a temperature of 250° C. and a time of 20 minutes and the final heating conditions comprised a temperature of 350° C. and a time of 15 minutes.

The thus formed organopolysiloxane film was transparent and had a maximum thickness of about 100 μm and a refractive index of 1.50. The film contained 18 wt % of a methyl group and 31 wt % of a phenyl group. When the evaluation of heat resistance was made on this substrate, the film did not crack and there was no change in the appearance and diffraction pattern of the film.

It is understood from the results of Examples and Comparative Examples that the organopolysiloxane layer of the present invention has high heat resistance and does not either discolor or peel off.

Example 4

A 25-mm² soda lime glass substrate having a thickness of 3 mm was prepared as a glass substrate. A release coating-coated glass mold, which has 50 semi-cylindrical recessed portions of each cylinder having a curvature radius of 20 μm arranged in parallel on the surface, was used as a mold. A solution C, prepared by adding formamide to solution A in an amount of 5% based on metal alkoxide contained in the solution A and stirring for 30 minutes, was poured onto the substrate to a thickness of about 50 μm in accordance with the substrate pouring process to form a lenticular lens. A heat treatment after coating was carried out at 160° C. for 60 minutes. The film was pressed at a pressure of 2 kg/cm², released from the mold and finally heated at 350° C. for 15 minutes. The thus formed organopolysiloxane film was transparent. When 20 cylindrical projecting portions of the substrate were randomly selected and the heights thereof were measured, the average height of the projecting portions from the surface of the substrate was 30 μm and the standard deviation was 0.10 μm. When the evaluation of heat resistance was made on this substrate, the film did not crack and there was no change in appearance, the height of each projecting portion of the film, its standard deviation and the pitch of the projecting portions.

According to the present invention, the volume shrinkage of the polysiloxane film was small at the time of curing and the film is very elastic (less fragile) due to large amounts of an alkyl group such as a methyl group and an aryl group such as a phenyl group remaining in the film. Therefore, the film has high strength and hardly cracks. Accordingly, an optical element or other article having a thick organopolysiloxane film and high heat resistance can be obtained at a low cost.

What is claimed is:

1. A process for producing an article having an uneven surface comprising:

forming a film of a sol material between a substrate of the article and a mold in such a manner that the film is in close contact with said substrate and said mold; and heating the film to form a gelled film, having a thickness of 1 μm to 1 mm and a surface configuration that is the inversion of the surface configuration of said mold, on a surface of said substrate of the article;

said sol material comprising:

component (A), a silane compound represented by the following formula (1):

$$R_2SiX_2 \qquad (1)$$

where R is an alkyl group and X is an alkoxyl group or a halogen atom; and component (B), a silane compound represented by the following formula (2):

$$R'SiX'_3 \qquad (2)$$

where R' is a substituted or unsubstituted aryl group and X' is an alkoxyl group or a halogen atom;

wherein the molar ratio of component (A) to component (B) is 1:0.2 to 1:4;

and wherein said article is an optical element or an information recording medium substrate, and said uneven surface serves as the optical element or functions as a pit or tracking guide in said information recording medium substrate.

2. The process of claim 1 for producing an article having an uneven surface, wherein the component (A) is dimethyldiethoxysilane and the component (B) is phenyltriethoxysilane.

3. The process of claim 1 for producing an article having an uneven surface, wherein the sol material is prepared by hydrolyzing a solution containing the component (A), the component (B), an alcohol, water and a catalyst under agitation and heating and vaporizing the volatile components in the solution to reduce the mass of the solution to 25 to 35 wt % of the mass before heating.

4. The process of claim 1 for producing an article having an uneven surface, wherein the sol material is prepared by hydrolyzing a solution containing the component (A), the component (B), an alcohol, water and a catalyst under agitation and heating the solution to remove the water and alcohol contained in the solution to become substantially zero.

5. The process of claim 3 for producing an article having an uneven surface, wherein the sol material is prepared by adding a tetraalkoxysilane, an alkyltrialkoxysilane, an alkyl hydrogen dialkoxysilane, a silane halide obtained by substituting part or all of the alkoxy groups of the tetraalkoxysilane by halogens, a silane halide obtained by substituting part or all of the alkoxy groups of the alkyltrialkoxysilane by halogens, or a silane halide obtained by substituting part or all of the alkoxy groups of the alkyl hydrogen dialkoxysilane by halogens in an amount of 10% or less based on the total number of moles of the components (A) and (B), to the hydrolyzed solution or the solution whose mass has been reduced.

6. The process of claim 3 for producing an article having an uneven surface, wherein the sol material is prepared by adding formamide in an amount of 10% or less based on the total number of moles of the components (A) and (B), to the solution whose mass has been reduced.

7. The process of claim 5 for producing an article having an uneven surface, wherein the sol material is prepared by adding formamide in an amount of 10% or less based on the total number of moles of the components (A) and (B), to the solution whose mass has been reduced.

8. The process according to claim 1 which comprises:
applying said sol material to said mold,
applying heat to form the film, on said mold,
bringing said substrate of the article into contact with the film on said mold,
applying further heat to bond the film on said mold to said substrate and to attain the gelled film, having the thickness of 1 μm to 1 mm and the surface configuration that is the inversion of the surface configuration of said mold.

9. The process according to claim 1 which comprises:
applying said sol material to a surface of said substrate,
applying heat to form the film on said surface,
bringing said mold into contact with the film on said substrate,
applying further heat to bond the film on said substrate to said mold and to attain the gelled film, having the thickness of 1 μm to 1 mm and the surface configuration that is the inversion of the surface configuration of said mold.

* * * * *